United States Patent Office 3,429,739
Patented Feb. 25, 1969

3,429,739
FIBROUS MATERIALS COATED WITH LINEAR p-XYLYLENE POLYMERS
Frederick R. Tittmann, Plainfield, Michael M. Goldin, North Plainfield, and William E. Loeb, Martinsville, N.J., assignors to Union Carbide Corporation, a corporation of New York
No Drawing. Filed Oct. 1, 1964, Ser. No. 400,912
U.S. Cl. 117—106
Int. Cl. B32b 27/12; C08g 53/14
5 Claims

ABSTRACT OF THE DISCLOSURE

Fibrous materials such as fabrics are coated by vapor depositing linear p-xylylene polymers which are essentially free of cross-linking and solvent extractable low molecular weight components.

---

This invention relates to fibers and fibrous materials coated with a uniformly insoluble, linear p-xylylene polymer. More particularly, this invention relates to fibrous materials such as fabrics coated with a vapor deposited linear, p-xylylene polymer essentially free of cross-linking and solvent extractable, low molecular weight components.

The utility of many fibrous materials is often limited in scope due to their friability, lack of abrasion resistance, loss of environmental corrosion, amenability to chemical attack, lack of stain resistance, low thermal stability, and other similar deficiencies. Heretofore, attempts to upgrade such materials have been frustrated due to the susceptibility of many fibrous materials to solvent attack. Accordingly, techniques other than the conventional methods of coating fibrous materials with solvent solutions of polymeric coatings are necessary. Attempts at providing a coating by polymerization of a liquid monomer in situ has also led to similar problems where the strength of the fiber is adversely affected by the solvent action of the monomer. High temperature polymerization or pyrolytic polymer deposition techniques have also been severely limited in application due to the possible damage to the fabric by exposure to such high temperature conditions. In one such technique, W. Kirk, Jr., in U. S. Patent 2,785,090, coated fabrics and other articles with a polymer formed by pyrolyzing p-xylene at 900° C. to 1000° C. causing molecular breakdown of a small portion of the p-xylene into p-xylylene diradicals and other polyfunctional radicals. These radicals then condense on the article to be coated forming a polymeric coating about the fabric or about the individual fibers which comprise the fabric.

Unfortunately however, this technique is severely limited in practical application. Not only does the extreme temperature of about 900° C. to 1000° C. affect thermally sensitive material and particularly oriented thermoplastic fibers, but also the condensation of the pyrolysis vapors produces, at best, a ploymeric mass comprises polymer chains having a wide range of molecular weight and a mixture of other materials including a substantial portion of unreacted p-xylene. Inasmuch as approximately 90 percent of the p-xylene goes through the pyrolysis unchanged, it too condenses on the substrate fiber or fabric together with the reactive radicals and can attack the fiber even during the coating resulting in a coating which is amenable to subsequent solvent attack. Although a considerable portion of the polymeric mass is comprised of substantially insoluble cross-linked polymer, almost about 20 percent by weight of the polymeric mass is comprised of relatively low molecular weight material which is soluble in such common solvents as benzene, acetone, carbon tetrachloride, and chloroform.

In many applications the extractable content of the coating would prove to be highly deleterious. Also, such extraction, as could occur in cleaning or washing of the material, frequently destroys the continuity of the coating and renders it permeable to substrate attacking fluids and vaporous material.

Accordingly, the present invention provides fibrous materials substantially impervious to solvent attack coated with a uniform, continuous, truly linear p-xylylene polymer substantially free of cross-linking and solvent extractable low molecular weight components, said polymeric coating being applied to said fibrous materials by the condensation thereon of reactive p-xylylene diradicals at temperatures below the condensation temperature of the diradicals, said diradicals being formed by the pyrolysis of a cyclic di-p-xylylene at temperatures between about 400° C. and 700° C.

As employed herein, the term "fibrous materials" is intended to encompass such natural fibers as the cellulosic fibers such as rayon and acetate; bast fibers such as hemp; fibers derived from wood pulp such as paper; seed hair fibers such as cotton; the protein fibers such as those stemming from mammals as for example, wool; silken fibers; mineral fibers such as glass, asbestos, or ceramic fibers; elemental fibers such as carbon or graphite fibers; metallic fibers such as lamés of gold, silver, or other metallic wires; and the synthetic fibers such as polyamides, polyesters, polyurethanes, polyacrylonitriles, and polyolefins such as polyethylene, polypropylene and the like, as well as the fabrics resulting therefrom.

The cyclic di-p-xylylenes which can be suitably employed in this invention are in general those represented by the formula:

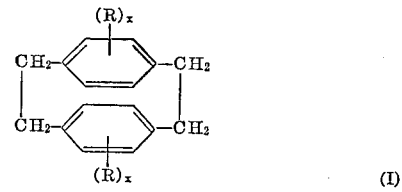

wherein R is an aromatic nuclear substituent group and $x$ is an integer from 0 to 3.

The substituent group R can be any organic or inorganic group which can normally be substituted on aromatic nuclei. Illustrations of such substituent groups are alkyl, aryl, alkenyl, amino, cyano, carboxyl, alkoxy, hydroxy alkyl, carbalkoxy, and like radicals as well as inorganic radicals such as hydroxyl, nitro, halogen, and other similar groups which are normally substitutable on aromatic nuclei.

Particularly preferred of the substituted groups are those simple hydrocarbon groups such as the lower alkyls as methyl, ethyl, propyl, butyl, hexyl, the halogen groups, particularly, fluorine, chlorine, bromine, and iodine and also, the cyano group, and hydrogen, i.e., where $x$ is 0.

The cyclic dimer, di-p-xylylene, and the substituted dimers used in this process are known in the art. The substituted dimers can be prepared from di-p-xylylene by appropriate treatment for the introduction of substituent groups. The substitution reactions are preferably conducted at low temperatures due to the possibility of cleavage or rearrangement of the di-p-xylylene by strong acids at elevated temperatures. Di-p-xylylene readily enters into free radical, base catalyzed, or acid catalyzed slightly elevated temperature reactions. Thus halogenation, alkylation, acetylation, nitration, amination, cyanation, and like methods for the introduction of such substituent groups as can normally be substituted on aromatic nuclei are applicable.

Such workers as D. J. Cram et al., J. Am. Chem. Soc., 81, p. 5977 (1959), 80, pp. 3094 and 3126 (1958), 77, p. 1179, 1186, and 6289 (1955), have prepared a substantial number of such materials, others being covered by U.S. Patent 3,117,168, entitled "Alkylated Di-p-Xylylenes," which is herewith incorporated by reference.

It has been found that a truly linear polymeric coating can be obtained by condensing the reactive diradicals obtained by pyrolyzing the cyclic dimer (I) to the reactive diradical (II) shown below. Preferably the cyclic dimer is first vaporized at low temperatures before pyrolysis. Vaporization of the di-p-xylylene commences at temperatures above at least about 100° C. The primary step of vaporization rather than direct pyrolysis is used to prevent local overheating and degradation of the dimer and also to insure a more efficient pyrolysis. However, the vaporization is not critically necessary for operation of this process.

The pyrolysis of the vaporous di-p-xylylene occurs at temperatures exceeding about 400° C., and most advantageously, at temperatures between about 550° C. and 700° C. Said pyrolysis results in the quantitive cleavage of the di-p-xylylene (I) and the formation of the reactive diradicals of the structure

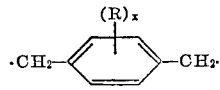

(II)

wherein $(R)_x$ represents the aromatic nuclear substituents as defined in structure (I). In other words, the pyrolytic cleavage does not result in any change in the aromatic portions of the di-p-xylylene precursor (I), and no other organic moieties or entities are present in the pyrolysis vapors.

Regardless of the pressure employed, pyrolysis of the starting di-p-xylylene begins at about 400° C. as pyrolysis does not appear to be a function of the operating pressure. At temperatures above about 700° C., cleavage of the substituent groups can occur, resulting in a tri- or polyfunctional species causing cross-linking or highly branched polymers.

Pyrolysis temperature is substantially independent of the operating pressure. It is however preferred that reduced or subatmospheric pressures be employed. For most operations, pressures within the range of about 0.0001 to 10 mm. Hg are most practical. However if desired, greater pressures can be employed. Likewise if desirable, inert non-organic, vaporous diluents such as nitrogen, argon, carbon dioxide, steam and the like can be employed to vary the optimum temperature of operation or to change the total effective pressure in the system. For example, when a suitable inert diluent is employed, pyrolysis can occur at pressures of about 200 mm. Hg and above.

The diradicals formed in the manner described above impinge upon the surface of the fibrous material, said surface being maintained at temperatures below the condensation temperature of the diradicals, and upon condensing thereon spontaneously polymerize to form a continuous uniform coating of a truly linear p-xylene polymer having the general structure:

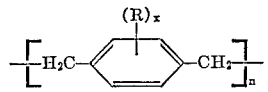

wherein R and $x$ are as defined above and $n$ is a number from about 5,000 to 50,000 or higher.

It has been observed that for each diradical species, there is a definite ceiling condensation temperature above which the diradical will not condense and polymerize. All observed ceilings of p-xylylene diradicals have been below about 250° C. but vary to some degree upon the operating pressure employed. For example, at 0.5 mm. Hg pressure, typical condensation and polymerization temperatures observed for the following diradicals are:

| | Degrees C. |
|---|---|
| p-Xylylene | 25–30 |
| Chloro-p-xylylene | 70–80 |
| Butyl-p-xylylene | 130–140 |
| Iodo-p-xylylene | 180–200 |
| Dichloro-p-xylylene | 200–250 |

Depending on the substituents present on the cyclic dimer either homopolymers or copolymers can be formed. For example, when $(R)_x$ is the same, in each instance in the recurring units, homopolymers are formed upon condensation of the diradicals. When either R or $x$ are different in the recurring units or a mixture of cyclic dimers are pyrolyzed, copolymers can be formed by maintaining the condensation temperature below the lowest ceiling condensation temperature of the substituted diradicals formed. Thus, it is seen that the condensation-polymerization operation does not affect the aromatic portion of the diradical (II), nor does it affect the substituent groups. It is readily observed that the R group is not critical and therefore can be any group normally substitutable on an aromatic nuclei, or hydrogen.

p-Xylylene polymers have unusually good resistance to practically all solvents. They are unaffected by such solvents as alcohols, ethers, simple aromatic liquids, ketones, epoxides, amines, and the like. They are soluble at temperatures above 200° C. in such materials as benzylbenzoate, chloro- and bromonaphthalene and chlorinated biphenyls. Thus fibrous materials coated with such polymers can safely be exposed to solvents at normal temperatures even up to about 200° C. without deleterious effects on the coating.

In this process, it has also been found possible to control the molecular weight of the polymers by control over the particular condensation conditions. It has been discovered for instance that within relatively narrow ranges of temperature changes in the condensation temperature (i.e., 10–20° C.) some distinct control over the molecular weight of the polymers can be secured, provided that all such temperatures are below the condensation temperature of the p-xylylene species.

In accordance with the preferred mode for carrying out the present invention, a measured quantity of the appropriate di-p-xylylene is placed within the vaporization zone of a vaporization-pyrolyzation furnace. The system is evacuated to the aforementioned pressure level and the di-p-xylylene is then passed through the pyrolysis zone. The pyrolysis zone should be long enough to provide for a residence time of about .001 to 1 second, or at least sufficient time to pyrolyze all the di-p-xylylene to the reactive diradical. The diradicals formed in the pyrolysis zone are passed through the nozzled terminal of the pyrolysis zone into the coating chamber which is under vacuum. The diradicals contact the fibrous materials arranged within the coating chamber and condense on the surfaces of said articles thus forming a polymeric film of the poly-p-xylylene. After the desired thickness of coating has been attained, the unit can be turned off and the coated fibrous materials recovered from the coating chamber.

The thickness of the polymeric coating is not narrowly critical but is dictated by the intended end use of the material. Certain materials can be coated with only a very thin coating of 0.1 mil or less of the poly-p-xylylene where only resistance to solvent or reactive attack is desired. With other materials which may be subjected to mechanical abuse during subsequent handling and use, it may be desired to coat the materials quite heavily, with one mil or more of polymer coating on the surface. When materials are lightly coated, they retain their original texture but are rendered stain, water, corrosion, and abrasion resistant. Heavier coatings upgrade properties to a higher degree, but can result in a loss of original texture and an increase in stiffness.

The following examples are illustrative of various embodiments of the present invention and are not to be construed in derogation of the scope and spirit thereof.

EXAMPLE 1

Dichloro-di-p-xylylene was placed within a borosilicate glass sublimation chamber measuring 2 inches in diameter and 4 inches long. A thermocouple gauge registered the pressure at one end of the chamber, the other end of said chamber being connected by a standard taper joint to a 1⅜ inch diameter quartz pyrolysis tube 26 inches long. The cyclic dimer was sublimed at an outside temperature of 135° C. and a pressure of about 0.2 mm. Hg. The vapors passed through a 6 inch section of the pyrolysis tube (vaporization zone) heated to 200° C. and then to a 19 inch length (pyrolysis zone) maintained at temperatures between about 680° C.–725° C. Connected to the terminal portion of the pyrolysis tube via a 5 inch long flanged dome was a deposition chamber 6 inches in diameter and 21½ inches long. Excess vapors were condensed in a Dry Ice-acetone trap. A 13 c.f.m. vacuum pump maintained the pressure at about 0.005 mm. Hg. The steam of chloro-p-xylylene diradicals thus formed impinged on a sample of cotton cloth weighing 1.9271 grams suspended in the deposition chamber. 0.0500 gram (2.6 percent based on original cloth weight) of poly(2-chloro-p-xylylene) was deposited on the cloth as a uniform coating. The original texture of the cloth was maintained. Ink, when dropped on the coated fabric, "balled up" similar to mercury on glass and easily rolled off. Any remaining particles of ink were readily removed with a water rinse.

EXAMPLE 2

In the same manner described in Example 1, several samples of kraft paper were coated with poly(2-chloro-p-xylylene) in coating weights varying from 1.25–11.3 percent based on original paper weight. The original texture of the paper was retained. A solution of 0.5 percent methanol blue chloride-99.5% methanol was applied to all the paper samples as well as uncoated controls to test for stain resistance. The stain penetrated all papers, indicating paper porosity was not impaired. The uncoated control samples stained badly whereas the lightest coating (1.25 percent) left only a very slight stain. The heaviest coating (11.3 percent) completely protected the paper from staining.

EXAMPLE 3

A thin wooden slab weighing 0.9170 gram was coated with 0.002 gram of poly-p-xylylene in the manner described in Example 1. Corrosion resistance to concentrated nitric acid was increased over an untreated sample which blackened immediately. The treated wooden substrate darkened slowly over a period of several minutes. Heavier coating weights further upgraded corrosion resistance. Similar results were obtained with sulfuric acid.

EXAMPLE 4

Manila rope, 9 inches long and ¾ inch in diameter was coated as described in Example 1. A coating weight of poly(2-chloro-p-xylylene) of 7.48 percent based on original substrate weight was deposited. The coated rope was immersed in 1.25 molar sodium hydroxide solution for about 48 hours and exhibited no visual changes; whereas, an untreated control sample exposed to the same medium swelled from ¾ inch to 1⅜ inches in diameter, turned yellow, and unraveled from its original coiled shape.

EXAMPLE 5

In the same manner as described in Example 1, glassine paper was coated with poly-p-xylylene in various thicknesses. Surprisingly, a synergistic effect was obtained in that the permeability of the coated glassine paper became less than the permeability of either glassine paper or poly-p-xylylene as the coating thickness was increased. Glassine paper, coated on one or both surfaces, exhibits excellent barrier properties and provides a superior packaging material which is durable, stain resistant, moisture proof and very impermeable. Table I shown below summarizes the results obtained using helium and methane as test gases.

TABLE I

| Coating thickness (microns) | Test gas | Permeability (cc. mil/100 in.²- 24 hr. atm.) |
|---|---|---|
| Poly-p-xylylene | Helium | 450 |
| Glassine paper | do | 62,000 |
| 1.5 | do | 8,700 |
| 2.7 | do | 4,000 |
| 6.9 | do | 5.7 |
| 9.1 | do | 4.3 |
| 9.6 | do | 3.1 |
| 13.8 | do | 1.4 |
| Poly-p-xylylene | Methane | 23 |
| Glassine paper | do | 35,000 |
| 2.7 | do | 2,400 |
| 9.1 | do | 0.42 |
| 9.6 | do | 1.25 |
| 13.8 | do | 0.66 |
| 23.8 | do | 1.2 |

EXAMPLE 6

Cellular polyethylene netting was coated with poly-p-xylylene as in Example 1. Coatings of about 15–20 percent by weight were applied to the 22 mil diameter strands. The resultant coated netting exhibited significantly improved strength, abrasion, scuff, and slip characteristics as compared to an untreated control sample.

What is claimed is:

1. Fibrous materials substantially impervious to solvent attack coated with a uniform, continuous, truly linear p-xylylene polymer substantially free of cross-linking and solvent extractable low molecular weight components.

2. Fibrous materials substantially impervious to solvent attack coated with a uniform, continuous, truly linear p-xylylene polymer substantially free of cross-linking and solvent extractable low molecular weight componts, said polymer coating being applied to the material by the condensation thereon of reactive p-xylylene diradicals having the general structure:

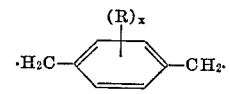

wherein R is an aromatic nuclear substituent group and $x$ is an integer from 0 to 3, inclusive, at temperatures below the condensation temperature of the diradical.

3. Fibrous materials substantially impervious to solvent attack, coated with a uniform, continuous, truly linear p-xylylene polymer substantially free of cross-linking and solvent extractable low molecular weight components, said polymer coating being applied to the material by the condensation thereon of reactive p-xylylene diradicals having the general structure:

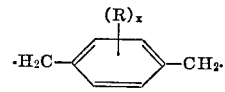

wherein R is an aromatic nuclear substituent group and $x$ is an integer from 0 to 3, inclusive, at temperatures below about 250° C., said diradicals being formed by the pyrolysis of a cyclic di-p-xylylene at temperatures between about 400° C. and 700° C.

4. Fibrous materials substantially impervious to solvent attack as defined in claim 3 wherein the reactive p-xylylene diradicals are formed by the pyrolysis of a cyclic di-p-xylylene at temperatures between about 550° C. and 700° C. and at pressures between about 0.001 to 10 mm. Hg.

5. Fibrous materials substantially impervious to solvent attack as defined in claim 3 wherein the reactive p-xylylene diradicals are formed in the presence of an inert, non-organic vaporous diluent.

References Cited

UNITED STATES PATENTS

| | | | |
|---|---|---|---|
| 2,785,090 | 3/1957 | Kirk | 117—106 |
| 3,274,267 | 9/1966 | Chow | 117—139.5 |
| 3,300,332 | 1/1967 | Gorham et al. | |
| 3,301,707 | 1/1967 | Loeb et al. | 117—106 X |
| 3,342,754 | 9/1967 | Gorham. | |

WILLIAM D. MARTIN, *Primary Examiner.*

T. G. DAVIS, *Assistant Examiner.*

U.S. Cl. X.R.

117—141, 124, 123, 128.4, 138.8, 161